US008201759B2

(12) United States Patent
Kendall et al.

(10) Patent No.: US 8,201,759 B2
(45) Date of Patent: Jun. 19, 2012

(54) BROADCAST SPREADER WITH RATE CONTROL SYSTEM

(75) Inventors: Jeffrey D. Kendall, Laurel, MD (US); Richard Sevrey, Bristol, IN (US)

(73) Assignee: Earth Way Products, Inc., Bristol, IN (US)

( * ) Notice: Subject to any disclaimer, the term of this patent is extended or adjusted under 35 U.S.C. 154(b) by 490 days.

(21) Appl. No.: 12/561,477

(22) Filed: Sep. 17, 2009

(65) Prior Publication Data

US 2010/0006666 A1 Jan. 14, 2010

Related U.S. Application Data

(63) Continuation-in-part of application No. 11/677,836, filed on Feb. 22, 2007, now abandoned, which is a continuation-in-part of application No. 11/488,496, filed on Jul. 18, 2006, now abandoned.

(60) Provisional application No. 60/700,156, filed on Jul. 18, 2005.

(51) Int. Cl.
*A01C 19/00* (2006.01)

(52) U.S. Cl. ........................................ 239/676; 239/650

(58) Field of Classification Search .................. 239/650, 239/652, 657, 663, 668, 676, 378, 379, 67–69
See application file for complete search history.

(56) References Cited

U.S. PATENT DOCUMENTS

| | | | |
|---|---|---|---|
| 4,157,150 A | 6/1979 | Hetrick | |
| 4,479,626 A | 10/1984 | Kluting et al. | |
| 4,846,529 A | 7/1989 | Tulley | |
| 5,128,500 A | 7/1992 | Hirschfeld | |
| 5,139,044 A | 8/1992 | Otten et al. | |
| 5,234,128 A | 8/1993 | Hill | |
| 5,278,363 A | 1/1994 | Krieg et al. | |
| 5,483,853 A | 1/1996 | Moradell et al. | |
| 5,668,357 A | 9/1997 | Takiguchi et al. | |
| 5,698,909 A | 12/1997 | Miyazawa | |
| 5,813,519 A | 9/1998 | Gotoh | |
| 5,866,862 A | 2/1999 | Riffil et al. | |
| 6,040,533 A | 3/2000 | Wagner | |
| 6,064,932 A | 5/2000 | Francois | |
| 6,198,244 B1 | 3/2001 | Hayden et al. | |
| 6,270,020 B1 | 8/2001 | Thompson et al. | |

(Continued)

FOREIGN PATENT DOCUMENTS

DE 3632902 4/1988

(Continued)

*Primary Examiner* — Davis Hwu
(74) *Attorney, Agent, or Firm* — Woodard, Emhardt, Moriarty, McNett & Henry LLP

(57) ABSTRACT

A control mechanism for a spreader incorporating a movable material control gate comprises a first limit switch having a fixed position, a linear actuator having a positional member which moves in response to operation of the linear actuator. Movement of the positional member in a first direction causes the positional member to contact the first limit switch to define a closed position of the control gate. The control mechanism also includes a second limit switch mounted to the positional member and an adjustment system comprising a user adjustment device engaged with a linear adjustment member adjustable through a positional linear range. Movement of the adjustment device by a user causes the adjustment member to move within the linear range. Additionally, movement of the positional member in a second direction causes the second limit switch to contact the adjustment member to define an adjustably open position of the control gate.

19 Claims, 5 Drawing Sheets

| U.S. PATENT DOCUMENTS | | | | FOREIGN PATENT DOCUMENTS | | |
|---|---|---|---|---|---|---|
| 6,502,771 B1 | 1/2003 | Wyne | FR | 2696384 | | 4/1994 |
| 6,637,678 B2 | 10/2003 | Wyne | FR | 2737686 | | 2/1997 |
| 6,894,234 B1 | 5/2005 | Sottong | GB | 2333226 | | 7/1999 |
| 6,907,832 B2 | 6/2005 | Wyne | WO | WO 97/04985 | | 2/1997 |
| 2006/0002762 A1 | 1/2006 | Crampton | WO | WO 03/004775 | A1 | 1/2003 |

BROADCAST SPREADER WITH RATE CONTROL SYSTEM

CROSS-REFERENCE TO RELATED APPLICATIONS

This application is a continuation-in-part of U.S. application Ser. No. 11/677,836, filed Feb. 22, 2007, now abandoned which is a continuation-in-part of U.S. application Ser. No. 11/488,496, filed Jul. 18, 2006, now abandoned which claims the benefit of U.S. Provisional Application No. 60/700,156, filed Jul. 18, 2005, all of which are hereby incorporated by reference.

BACKGROUND

The lawn care or landscape maintenance industry uses spreaders to apply products, such as fertilizer and other granulated material, to maintain and promote a healthy lawn, for example. Often the landscaper or lawn care worker must apply these products to a lawn in a climate that changes over the course of a calendar year. For example, in some geographic areas the spring season may have a climate with relatively low humidity and low temperatures compared to its summer season that may have a climate with relatively high humidity and high temperatures. The level of humidity typically affects the fertilizer or granulated material in the spreader such that the fertilizer or granulated material will clot or clump in the spreader, thereby making it difficult for the material to pass smoothly through the spreader to be distributed onto a lawn.

Often spreaders have a shut-off plate or control gate that controls the rate that a fertilizer is applied to a lawn. The shut-off plate may be attached to, and controlled by, a solenoid which may work in combination with a spring. Similar problems exist with solenoid-spring operators in other applications. Solenoid-spring operators move an operator between two positions. The spring acts on the operator tending to move the operator in a first direction (usually a "closed" position). The solenoid, when energized tends to move the operator in a second direction generally opposite the first direction (usually an "open" position). To reach the open position, the solenoid must overcome the force applied to the spring. When the operator is in the open position, the spring is stretched. When the solenoid is deenergized removing the force overcoming the spring, the spring moves the operator to the first position. Over time as the spring ages and wears out, it applies a lesser force against the force of the solenoid. As a result, the operator moves further in the "open" position and the spring does not return the operator to the "closed" position.

It is also difficult to balance the rate of closure of the shut-off plate spring with the opening power of the solenoid in both humid climates (where the fertilizer becomes sticky) and dry climates (where the fertilizer remains granular). In these situations, too much solenoid power, or too weak a spring, may prevent the spring from efficiently closing the shut-off plate in dry weather, while too little solenoid power, or too strong a spring, may not allow the shut-off plate to open properly in humid weather. Either situation may result in an improper amount of material being spread or applied. For that reason, spreaders and other devices having a solenoid and spring combination have not proven to be completely satisfactory, and improved means of operating a shut-off plate on spreaders is needed. It is desirable that a spreader be capable of delivering an accurate amount of fertilizer or other material with repeatable opening and closing of the shut-off plate in any environment.

SUMMARY

In certain embodiments, a spreader comprises a hopper for holding a quantity of material, the hopper having a bottom surface and at least one aperture defined in the bottom surface through which the material passes. The spreader includes a control gate positioned adjacent the bottom surface of the hopper, wherein the control gate defines at least one aperture and wherein the control gate is configured to move to cause the aperture defined in the control gate to correspondingly move into and out of alignment with the aperture defined in the bottom surface of the hopper. Additionally, the spreader includes an electrically-operable position control system operatively coupled with the control gate and adapted for controlling the position of the control gate between a fully closed position and a fully open position. The open position is defined by the aperture defined in the control gate fully aligned with the aperture defined in the bottom surface of the hopper and the closed position is defined by the aperture defined in the control gate fully out of alignment with the aperture defined in the bottom surface of the hopper. The position control system is operable to position the control gate at least one partial-alignment position between the fully open and closed positions. Additionally, the position control system includes a first limit switch and a carriage linked to the control gate moveable along an actuating rod relative to the first limit switch. The position control system includes a linear adjustment rod operatively coupled to a rotary knob, the linear adjustment rod having a proximal end engaged with the rotary knob and an opposite distal end, whereby rotary movement of the knob causes linear movement of the linear adjustment rod. The carriage is configured to move along the actuating rod in a first direction until the carriage contacts the first limit switch, whereby movement of the carriage causes movement of the control gate. Contact between the carriage and the first limit switch causes further movement of the carriage in the first direction to be stopped corresponding to the closed position of the control gate. The carriage includes a second limit switch and is configured to move along the actuating rod in a second direction opposite the first direction until the second limit switch on the carriage contacts the distal end of the linear adjustment rod. Contact between the second limit switch and the linear adjustment rod causes further movement of the carriage in the second direction to be stopped corresponding to the open or partial-alignment position of the control gate based on the linear position of the linear adjustment rod.

In certain other embodiments, a control mechanism for a spreader incorporating a movable material control gate comprises a first limit switch having a fixed position, and a linear actuator having a positional member, the positional member moving in response to operation of the linear actuator. Movement of the positional member in a first direction causes the positional member to contact the first limit switch to define a closed position of the material control gate. The control mechanism includes a second limit switch mounted to the positional member and an adjustment system comprising a user adjustment device engaged with a linear adjustment member adjustable through a positional linear range. Movement of the adjustment device by a user causes the adjustment member to move within the positional linear range. Additionally, movement of the positional member in a second direction causes the second limit switch to contact the adjustment member to define an adjustably open position of the material control gate.

In yet other embodiments, a spreader comprises a hopper for holding a quantity of material, the hopper having a bottom surface and at least one aperture defined in the bottom surface through which the material passes. The spreader includes a control gate positioned adjacent the bottom surface of the hopper. The control gate defines at least one aperture and is configured to move to cause the aperture defined in the control gate to correspondingly move into and out of alignment with the aperture defined in the bottom surface of the hopper. The spreader includes an electrically-operable position control system operatively coupled with the control gate and adapted for controlling the position of the control gate between a fully closed position and a fully open position. The open position is defined by the aperture defined in the control gate fully aligned with the aperture defined in the bottom surface of the hopper and the closed position is defined by the aperture defined in the control gate fully out of alignment with the aperture defined in the bottom surface of the hopper. The position control system is operable to position the control gate at least one partial-alignment position between the fully open and closed positions. The position control system includes a first limit switch and a carriage linked to the control gate, the carriage being configured to move along an actuating rod relative to the first limit switch. The carriage includes a second limit switch and a linear adjustment rod extending out from the carriage. Additionally, the position control system includes a rotary knob configured to be turned by a user having a helix portion with an inclined surface, the linear adjustment rod having a proximal end aligned to contact the helix portion of the rotary knob and an opposite distal end positioned within the carriage. Turning the rotary knob causes the helix portion to rotate thereby changing the location along the inclined surface that is aligned with the proximal end of the linear adjustment rod. The carriage is configured to move along the actuating rod in a first direction until the carriage contacts the first limit switch. Movement of the carriage causes movement of the control gate. Additionally, contact between the carriage and the first limit switch causes further movement of the carriage in the first direction to be stopped corresponding to the closed position of the control gate. The carriage is configured to move along the actuating rod in a second direction opposite the first direction so that the proximal end of the linear adjustment rod contacts the inclined surface. Contact between the linear adjustment rod and the inclined surfaces causes further movement of the linear adjustment rod to be stopped. The carriage is configured to continue moving along the actuating rod in the second direction relative to the linear adjustment rod until the second limit switch within the carriage contacts the distal end of the linear adjustment rod. Contact between the second limit switch and the distal end of the linear adjustment rod causes further movement of the carriage in the second direction to be stopped corresponding to the open or partial-alignment position of the control gate based on the linear position of the linear adjustment rod.

In further embodiments, a method for operating a spreader comprises providing a spreader having a hopper for holding a quantity of material. The spreader includes a control gate to control the flow of material from the hopper and includes a control system for controlling the position of the control gate between a closed position, an open position and at least one adjustably open position between the open and closed positions. The control system includes a motor operatively controlled by a motor control switch, a carriage configured to move along an actuating rod operatively coupled to the motor, and a rotary knob configured to cooperate with a linear adjustment rod, the linear adjustment rod being configured to travel within a linear positional range. The method includes placing a quantity of material in the hopper of the spreader and turning the knob to a selected position representing one of the open or adjustably open positions. The selected position of the knob corresponds to a selected position of the linear adjustment rod within the linear positional range. The method further includes activating the motor control switch to move the control gate to the open or adjustably open position represented by the selected position of the knob and the switch sending a signal to the motor to activate movement of the carriage. Additionally, the method includes the motor causing the carriage to move along the actuating rod in a first direction until the limit switch on the carriage contacts the distal end of the linear adjustment rod and the motor ceasing movement of the carriage at a first stopped position as a result of the contact between the limit switch on the carriage and the linear adjustment rod. The first stopped position of the carriage corresponds to the open or adjustably open position represented by the selected position of the knob. The method also includes operating the spreader to spread the material out of the hopper.

DESCRIPTION OF THE ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles of the disclosure being contemplated as would normally occur to one skilled in the art to which the disclosure relates.

Figure 1:
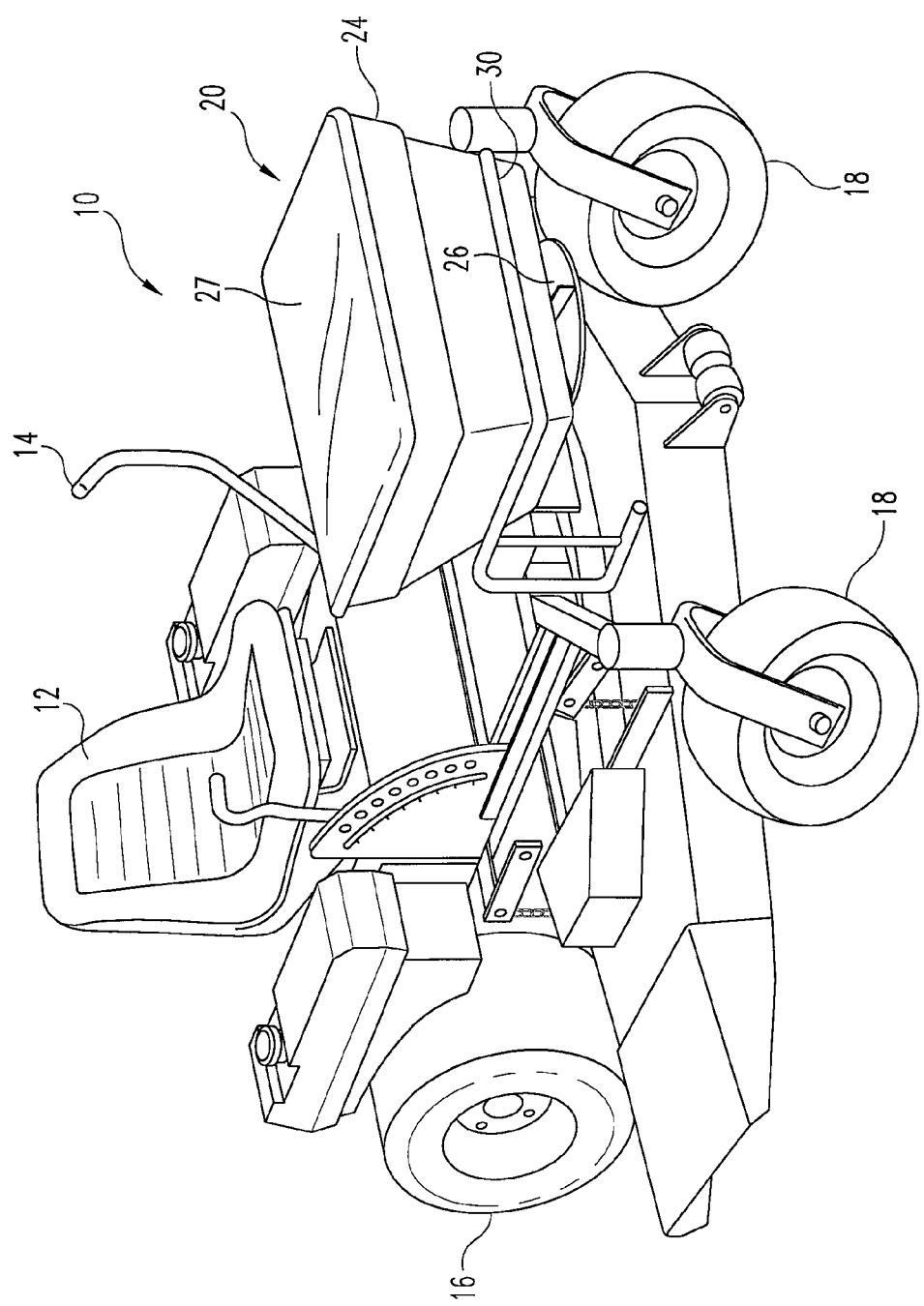
FIG. 1 is a perspective view of a material spreader constructed in accordance with an embodiment of the present disclosure, illustratively shown as being mounted to a riding mower.

Referring to FIG. 1, there is illustratively shown a zero turning radius riding mower 10, having a seat 12, with a steering control mechanism 14. Mower 10 is illustratively supported by one or more back wheels 16 and one or more front wheels 18. In the embodiment shown, a spreader 20 constructed in accordance with an example embodiment of the present disclosure is mounted near the front of mower 10. As an example, spreader 20 may be used for the application of granular type fertilizer or seed, as non-limiting examples, to the surface of a lawn or other planted areas, although other uses and applications of spreader 20 are of course possible. In alternative embodiments, various spreader embodiments contemplated by the present disclosure may be pulled behind a tractor, riding mower, or another type of vehicle adapted for pulling devices such as spreader 20. Details of the construction and operation of various embodiments of the disclosure will be explained in greater detail with reference to FIGS. 2 through 5.

Figure 2:
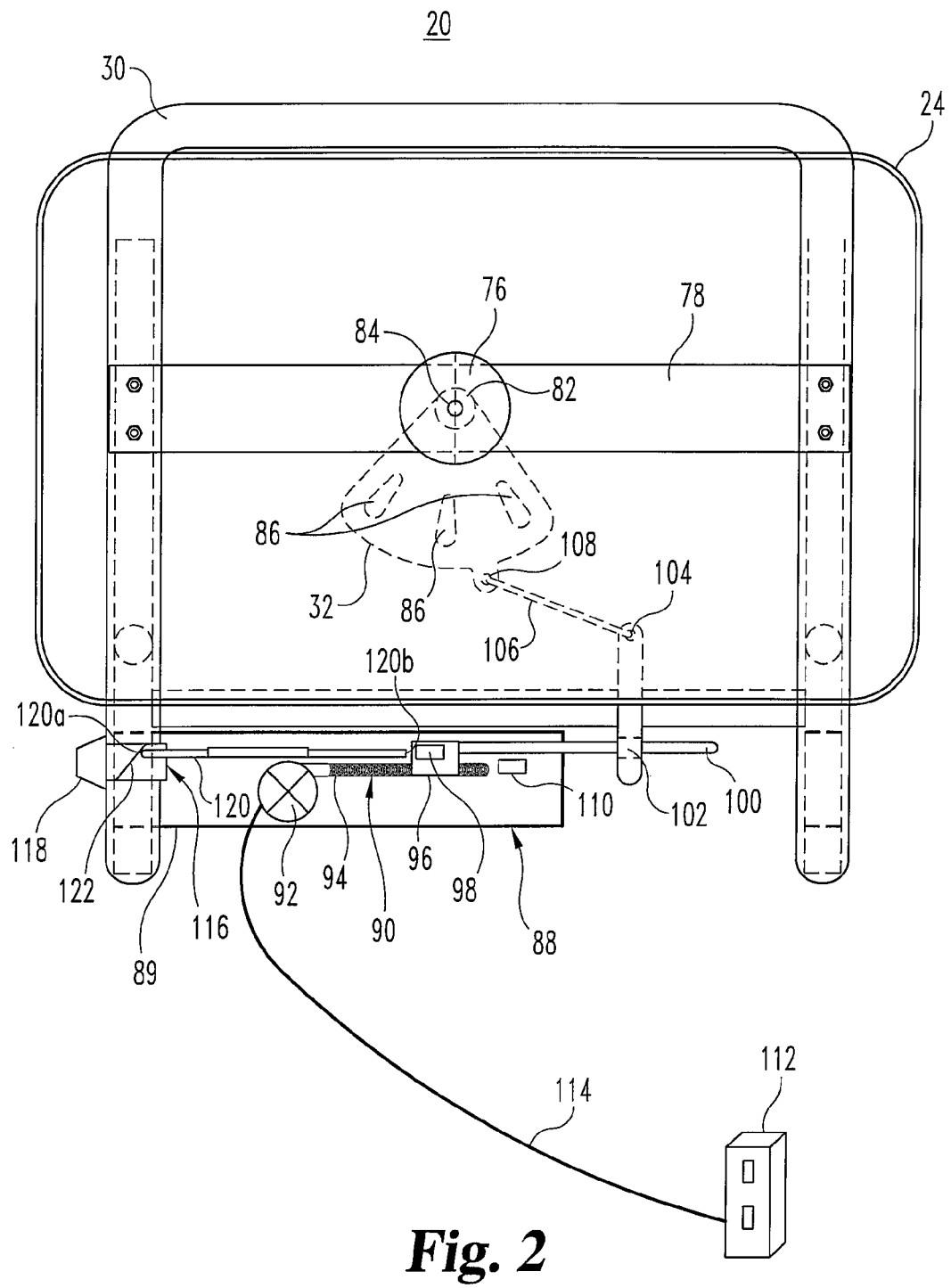
FIG. 2 is a top view of a portion of a spreader constructed in accordance with an embodiment of the present disclosure.

As can be seen in FIG. 1, spreader 20 incorporates a hopper 24 containing a quantity of material 27, which may be a variety of appropriate materials to be spread, including fertilizer or seed as examples. Below hopper 24 is positioned a material distribution blade or paddle assembly 26. Distribution blade assembly 26 is illustratively operated by a motor which may be located and/or mounted at a variety of appropriate locations with respect to spreader 20. The motor is operable to activate blade or paddle assembly 26 to spread or scatter material placed in hopper 24 as it descends by gravity from hopper 24. In the illustrated embodiment, support structure 30 structurally supports hopper 24 and the other related components and provides a means for mounting the spreader 20 to mower 10. Spreader 20 also incorporates a control gate or shut-off plate 32 located along the underside of hopper 24. As can be seen in FIG. 2, control gate 32 includes a number of apertures designed to align with similarly positioned apertures or discharge ports or holes located in the bottom of hopper 24, so that when control gate 32 is pivoted into an open or operating position, the alignment of such apertures with the openings at the bottom of hopper 24 allows material to fall out of hopper 24 for dispersal by blade or paddle assembly 26.

Referring to FIG. 2, there is shown a top view of material spreader 20 with support structure 30 to which hopper 24 is mounted. An example motor 76, which may be of the impeller type, is illustratively shown as being located within hopper 24 for rotating the material dispersion blades or paddles (not shown in this figure). Motor 76 is illustratively shown as being mounted to support member 78, which is attached to support structure 30. However, it should be appreciated that the mounting and placement of motor 76, support member 78 and support structure 30 may be varied as would occur to one of ordinary skill in the art. Also shown in FIG. 2 is hopper control gate 32, which may be positioned along the underside of hopper 24. In alternative embodiments, gate 32 may be positioned within hopper 24. Control gate 32 is illustratively shown as mounted such that pivot aperture or hole 82 fits over mounting boss or post 84, but other means and mounting structures are of course possible. Control gate 32 therefore pivots around the pivot point established by aperture 82 and mounting boss 84. Control gate 32 also incorporates apertures, holes, or orifices 86 which, when aligned with similarly sized apertures, holes, or orifices (not shown) located in the bottom of hopper 24, allow the material contained in hopper 24 to flow out of hopper 24 to be dispersed by rotating dispersing blades or paddles, such as distribution blade assembly 26 for example. The degree to which the apertures 86 are in alignment with the apertures or holes in hopper 24 determines the rate at which the material in hopper 24 is applied. In certain embodiments, spreader 20 may include an agitator (not shown) which may be utilized to transmit vibrations to hopper 24 to ensure uniform broadcasting of the material contained within the hopper.

In accordance with an example embodiment of the present disclosure, the position of control gate 32 is determined by an application rate control system 88. Rate control system 88 incorporates an optional housing 89, within which is positioned a linear actuator 90, comprising a motor 92 and an actuating rod 94. To best illustrate the components within housing 89 and for the sake of illustration purposes, FIG. 2 is intended to show a cross-section of housing 89 (without hatching, for clarity) and/or one side of housing 89 is transparent so that the internal components may be seen. In the illustrated embodiment, a carriage 96 is mounted on actuating rod 94 such that carriage 96 moves through and is stoppable at a number of positions along actuating rod 94. Carriage 96 incorporates a limit switch 98 and a positioning rod 100. In the illustrated embodiment, system 88 utilizes a bracket or collar 102 engaged with a cable or rod 106 to operably couple the positioning rod 100 with the control gate 32. However, it should be appreciated that the positioning rod 100 may be operably coupled with the control gate 32 in a variety of other appropriate manners as would occur to one of ordinary skill in the art. In certain embodiments, bracket 102 functions as a calibrating bracket utilized to establish a starting calibration point with respect to the full open and closed positions of gate 32.

In the illustrated embodiment, bracket 102 is mounted on rod 100 near one end, with the rod 100 extending through a passage defined in the bracket 102. Additionally, bracket 102 may incorporate an aperture or hole 104 near the other end through which the cable or rod 106 is attached. In a particular example embodiment, pins or similar appropriate fasteners may be used to secure rod 106 to gate 32 and bracket 102 at opposite ends thereof. Additionally, in a particular example embodiment, a set screw or similar appropriate fastener may be used to secure bracket 102 to rod 100. Other means and configurations of attaching or mounting cable or rod 106 to bracket 102 and bracket 102 to rod 100 are of course possible. The other end of cable or rod 106 is shown as being illustratively attached to control gate 32 via aperture or hole 108 defined in the control gate. However, it should be appreciated that other appropriate means of engaging cable or rod 106 with control gate 32 are contemplated by the present disclosure.

In the illustrated embodiment, a second limit switch 110 is shown mounted within housing 89. Motor 92 is illustratively shown as being operated by a switch 112 via a wire 114, although other appropriate means of communicating with and controlling the operation of motor 92, including wireless remote control, is possible and contemplated by this disclosure. A material rate flow control system 116, comprising an adjustment knob 118 and a linear adjustment or control rod 120, may also be mounted to and/or within housing 89 as part of rate control system 88. Adjustment knob 118 is shown as illustratively having an inclined surface 122 which functions to adjust the lateral position of control rod 120. In certain embodiments, control rod 120 will be positioned closer to, or away from, limit switch 110, depending upon the amount that knob 118 is turned by a user and thereby the position of surface 122. End 120a of rod 120 may be engaged with inclined surface 122 such that movement of inclined surface 122 (caused by rotary adjustment of knob 118) correspondingly moves rod 120 in along a lateral axis. In a particular example embodiment, rod 120 may be spring loaded in a linear direction toward adjustment knob 118, thereby positioning end 120a against surface 122. As illustrated, in certain embodiments, limit switch 98 is mounted to or within carriage 96 in alignment with rod 120 so that contact between switch 98 and rod 120 is made possible.

In the particular illustrated embodiment, the operation of motor 92 moves carriage 96 along rod 94. In the situation where carriage 96 is moving in a direction away from control rod 120, motor 92 is caused to stop operation when carriage 96 contacts limit switch 110. At this position, rod 100 will have moved bracket 102, which thereby moves cable 106, which thereby moves control gate 32 to a position wherein apertures 86 are pulled fully out of alignment with the apertures defined in the bottom of the hopper. This represents a fully closed position or condition of control gate 32. When carriage 96 is moving in the other direction, i.e., toward control rod 120, limit switch 98 will eventually contact the end of control rod 120, thereby causing motor 92 to stop operation. When knob 118 is adjusted so that control rod 120 is positioned as far from limit switch 110 as possible (i.e., in a retracted position), carriage 96 will move along rod 94 all the way to the extreme lateral position. At this position, carriage 96 will have moved rod 100, which thereby moves bracket 102, which thereby moves cable 106, which thereby moves control gate 32 to a position wherein apertures 86 are fully aligned with the apertures defined in the bottom of the hopper. This represents a fully open position or condition of control gate 32.

Intermediate linear adjustment of knob 118 between the two extreme positions discussed above will move control rod 120 in such a way as to allow control gate 32 to be opened by a fixed, determinable amount, such that the degree of openness of control gate 32 can be accurately controlled. Indicia (e.g., ⅛, ¼, ½, etc.) may be printed on knob 118 to provide a visual feedback of the degree of opening being provided to control gate 32. In certain embodiments, the operation of knob 118, via inclined surface 122, allows for any degree of openness of control gate 32 between fully opened and fully closed positions. Knob 118 may be configured in a variety of appropriate manners to allow a user to turn the knob 118 to reach the desired degree of openness.

Figure 3:
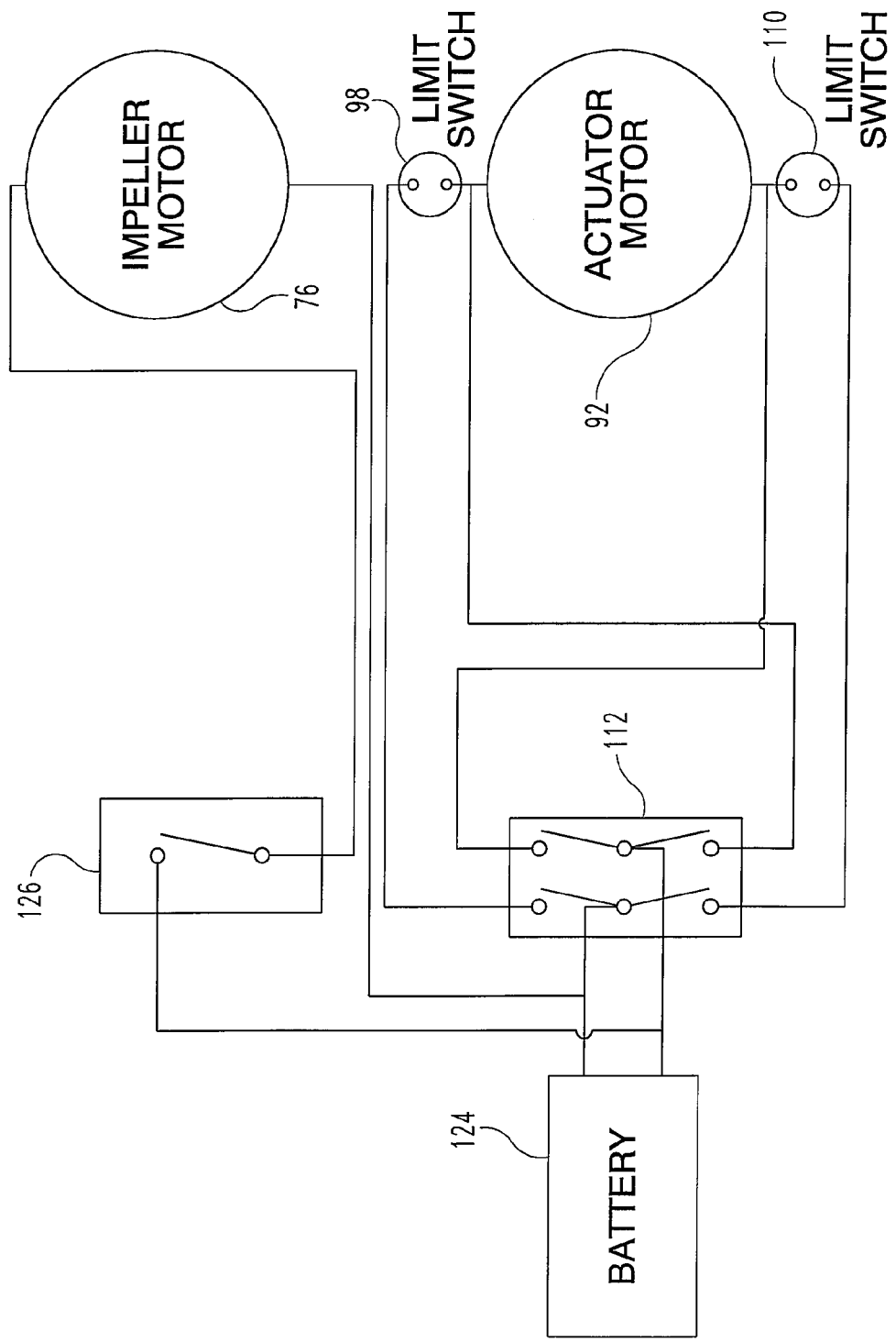
FIG. 3 is a schematic wiring diagram for a spreader rate control apparatus constructed in accordance with an embodiment of the present disclosure.

FIG. 3 illustrates a portion of the schematic wiring for spreader 20 incorporating rate control system 88. In the illustrated embodiment, power for motor 76, illustratively shown as an impeller motor in FIG. 3, and actuator motor 92 is provided by battery 124. Example switch 126 is illustratively provided to control the operation of motor 76 located in hopper 24 of spreader 20. Example switch 112 is illustratively shown as a double-pole, double-throw switch that causes motor 92 to move control gate 32 via rate control system 88 discussed above toward the fully opened or closed positions, depending upon the switch position selected. Limit switches 98 and 110 are illustratively shown as normally-closed contact switches, but other switch types and other means for controlling the operation of motor 92 are possible and are considered to be within the scope of the present disclosure.

Figure 4:
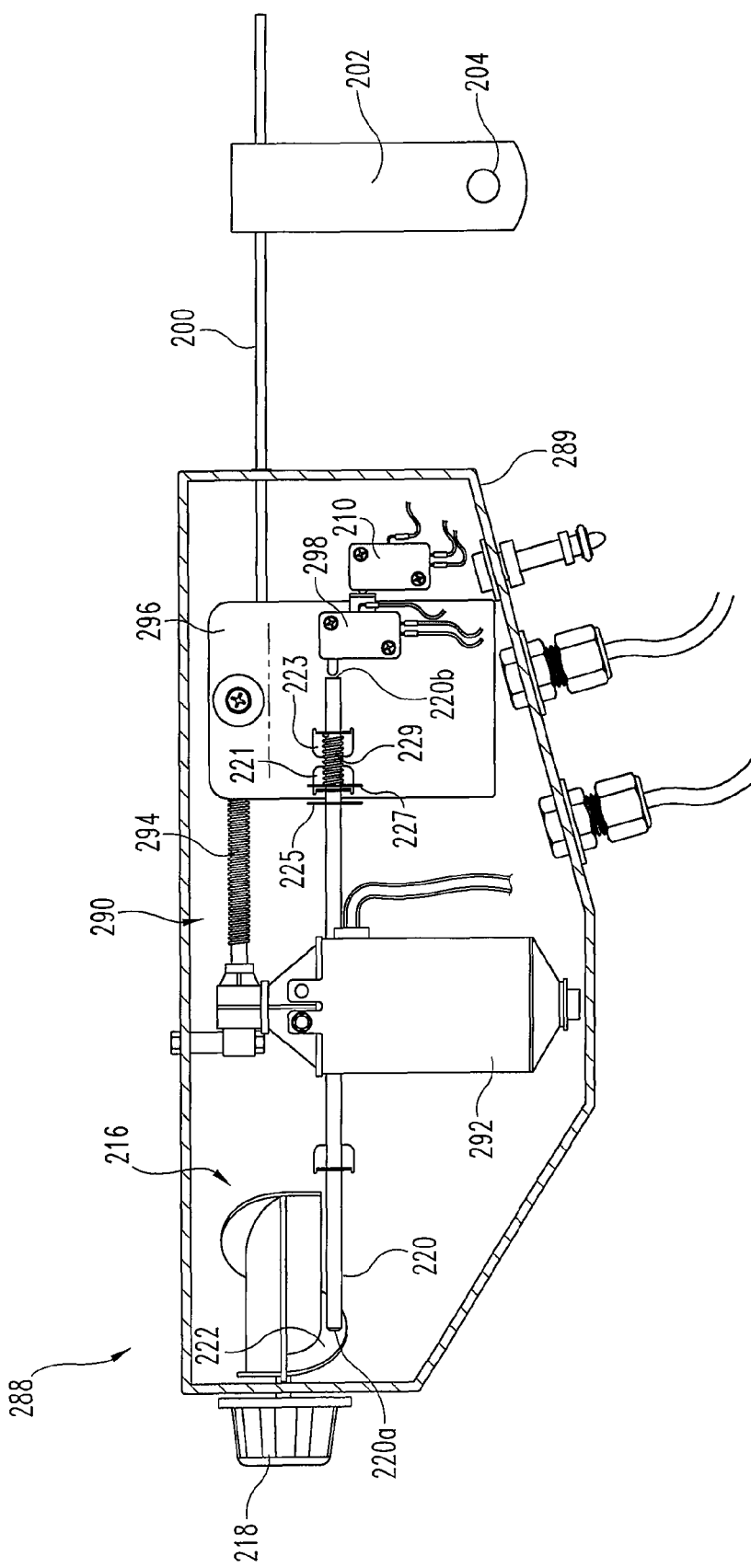
FIG. 4 is a front plan view of a portion of a spreader constructed in accordance with another embodiment of the present disclosure.
Figure 5:
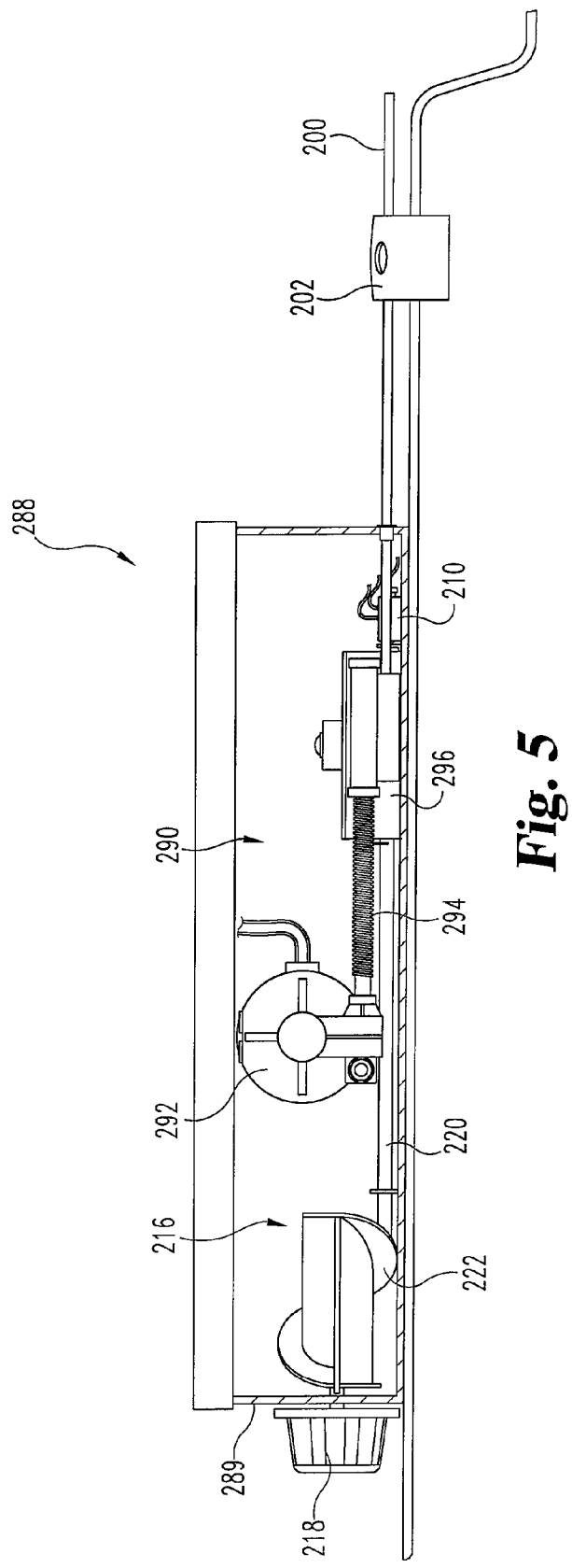
FIG. 5 is a top plan view of the portion of the spreader shown in FIG. 4.

FIGS. 4 and 5 illustrate another example control system according to another embodiment of the present disclosure. In the embodiment illustrated in FIGS. 4 and 5, there is shown a position control system 288. Control system 288 is operatively coupled to a control gate (not shown) engaged with a hopper, such as control gate 32 engaged with hopper 24 as an example, and operable to position the control gate as desired by a user. Control system 288 incorporates an optional housing 289, within which is positioned a linear actuator 290, comprising a motor 292 and an actuating rod 294. To best illustrate the components within housing 289 and for the sake of illustration purposes, FIGS. 4 and 5 are intended to show a cross-section of housing 289 and/or one side of housing 289 is transparent so that the internal components may be seen. In the illustrated embodiment, a carriage 296 is mounted on actuating rod 294 such that carriage 296 moves through and is stoppable at a number of positions along actuating rod 294. As illustrated, carriage 296 incorporates a limit switch 298 and a positioning rod 200. In the illustrated embodiment, system 288 utilizes a bracket or collar 202, along with possibly other components, to couple the positioning rod 200 with the control gate. Bracket or collar 202 may be mounted on rod 200 and incorporate an aperture or hole 204 used for attaching the control system 288 to the control gate. It is contemplated that other means of attaching or mounting the control system 288 to the control gate are of course possible. In the illustrated embodiment, system 288 includes an adjustment or stop rod 220 moveably attached to carriage 296. In an example embodiment, stop rod 220 may be configured to move through guides 221 and 223 incorporated in or on carriage 296. Additionally, pins 225 and 227 may be attached to stop rod 220 on opposite sides of guide 221. Further, a spring 229 may be positioned between pin 227 and guide 223 to dampen the contact of stop rod 220 with limit switch 298.

As illustrated, a second limit switch 210 is mounted within housing 289. Additionally, motor 292 may be operated by a switch (not shown) which communicates via a wireless or wired connection to the motor or through other appropriate means of controlling the operation of motor 292. A position stop control system 216, comprising an adjustment knob 218 and stop rod 220, may also be mounted to and/or within housing 289 as part of position control system 288. Adjustment knob 218 is shown as illustratively having a linear inclined surface 222 aligned with stop rod 220 and which limits the distance that stop rod 220 can travel before contacting the inclined surface 222. Because carriage 296 can move through numerous positions, an infinite number in certain embodiments, while traveling along rod 294, position stop control 216 can be adjusted to stop carriage 296 at any desired position along rod 294 by turning knob 118 to position surface 222 as desired. As a result, positioning rod 200 is stoppable at a number of positions between two lateral end positions based on the rotary adjustment of knob 218. In certain embodiments, positioning rod 200 may be stoppable at an infinite number of positions.

The operation of motor 292 moves carriage 296 along rod 294. In the situation where carriage 296 is moving in a direction extending positioning rod 200 from the housing 289, motor 292 is caused to stop operation when carriage 296 contacts limit switch 210. This represents a first lateral end position. When carriage 296 is moving in the other direction, i.e., toward adjustment knob 208, stop rod 220 moves with carriage 296 until end 220a of stop rod 220 contacts inclined surface 222. This contact stops further movement of rod 220, but permits carriage 296 to continue moving. At the moment of contact between rod 220 and surface 222, a gap may exist between pin 225 and guide 221, pin 227 is adjacent to guide 221 and spring 229 is uncompressed. As carriage 296 continues moving relative to the stationary stop rod 220, guide 221 moves toward pin 225 and guide 223 moves toward pin 227 thereby compressing spring 229. The configuration of the guides 221 and 223 and the pins 225 and 227 allows for the relative movement between carriage 296 and rod 220. The movement of carriage 296 continues until limit switch 298 (which moves along with carriage 296) contacts end 220b of stop rod 220, thereby stopping operation of motor 292. This represents a second lateral end position. The first and second lateral end positions may correspond to the fully opened and closed positions of the control gate, respectively, or vice versa.

When knob 218 is adjusted so that stop rod 220 travels the furthest distance, the contact of limit switch 298 with the end 220b of rod 220 represents a fully extended position of the control gate, such as a fully opened or closed position. Intermediate linear adjustment of knob 218 will limit the travel of stop rod 220 in such a way as to position the control gate in intermittent positions between the first and second lateral end positions. In this way, the control gate may be opened by a fixed, determinable amount, such that the degree of openness of the control gate can be accurately controlled. Position indicia (e.g., 1, 2, 3, etc.) may be printed on knob 218 to provide a visual feedback of the amount of travel between the first and second lateral end positions and thus the degree of opening of the control gate provided by system 288. In certain embodiments, the operation of knob 218, via inclined surface 222, allows for any degree of openness of the control gate between the first and second extreme positions.

In certain embodiments, system 88 and/or system 288 may be incorporated in the design and construction of independent spreaders, or in vehicle-spreader combinations. In certain other embodiments, system 88 and/or system 288 may be manufactured and sold as a retrofit or aftermarket module that can be installed on spreaders or spreader vehicles to provide accurate flow rate control as discussed above. Additionally, system 88 and/or system 288 may be retrofitted on items that are currently outfitted with different opening mechanisms, including solenoid and spring combination operators.

Alternatively to controlling the degree of opening of a control gate for a spreader, system 88 and/or system 288 may be used to control the position of other appropriate items, including a slide gate, the vanes of a snow plow or snow blower, a door, blinds, shudders, or vents, to name a few non-limiting examples.

While the disclosure has been illustrated and described in detail in the drawings and foregoing description, the same is to be considered as illustrative and not restrictive in character, it being understood that only the preferred embodiment has been shown and described and that all changes and modifications that come within the spirit of the disclosure are desired to be protected.

What is claimed is:

1. A spreader, comprising:
   a hopper for holding a quantity of material, the hopper having a bottom surface and at least one aperture defined in the bottom surface through which the material passes;
   a control gate positioned adjacent the bottom surface of the hopper, wherein the control gate defines at least one aperture, wherein the control gate is configured to move to cause the aperture defined in the control gate to correspondingly move into and out of alignment with the aperture defined in the bottom surface of the hopper; and
   an electrically-operable position control system operatively coupled with the control gate and adapted for controlling the position of the control gate between a fully closed position and a fully open position, wherein the open position is defined by the aperture defined in the control gate fully aligned with the aperture defined in the bottom surface of the hopper and the closed position is defined by the aperture defined in the control gate fully out of alignment with the aperture defined in the bottom surface of the hopper, wherein the position control system is operable to position the control gate at at least one partial-alignment position between the fully open and closed positions;
   wherein the position control system includes a first limit switch and a carriage linked to the control gate moveable along an actuating rod relative to the first limit switch, wherein the position control system includes a linear adjustment rod operatively coupled to a rotary knob, the linear adjustment rod having a proximal end engaged with the rotary knob and an opposite distal end, whereby rotary movement of the knob causes linear movement of the linear adjustment rod;
   wherein the carriage is configured to move along the actuating rod in a first direction until the carriage contacts the first limit switch, whereby movement of the carriage causes movement of the control gate, whereby contact between the carriage and the first limit switch causes further movement of the carriage in the first direction to be stopped corresponding to the closed position of the control gate, wherein the carriage includes a second limit switch and is configured to move along the actuating rod in a second direction opposite the first direction until the second limit switch on the carriage contacts the distal end of the linear adjustment rod, whereby contact between the second limit switch and the linear adjustment rod causes further movement of the carriage in the second direction to be stopped corresponding to the open or partial-alignment position of the control gate based on the linear position of the linear adjustment rod.

2. The spreader of claim 1, wherein the position control system includes a motor operatively coupled to the actuating rod and operable to actuate movement of the carriage along the actuating rod.

3. The spreader of claim 2, wherein the position control system includes a user control switch operatively coupled to the motor and being operable to control the operation of the motor.

4. The spreader of claim 1, wherein the position control system includes a positioning rod engaged with the carriage, the positioning rod being linked via a linkage system to the control gate.

5. The spreader of claim 1, wherein the position of the first limit switch is stationary within the position control system.

6. The spreader of claim 1, wherein the second limit switch is mounted on the carriage and configured to move with the carriage.

7. The spreader of claim 1, wherein the carriage is linearly aligned with the first limit switch and the linear adjustment rod is linearly aligned with the second limit switch mounted on the carriage.

8. The spreader of claim 1, wherein the rotary knob includes a helix portion having an inclined surface engaged with the proximal end of the linear adjustment rod.

9. A spreader, comprising:
   a hopper for holding a quantity of material, the hopper having a bottom surface and at least one aperture defined in the bottom surface through which the material passes;
   a control gate positioned adjacent the bottom surface of the hopper, wherein the control gate defines at least one aperture, wherein the control gate is configured to move to cause the aperture defined in the control gate to correspondingly move into and out of alignment with the aperture defined in the bottom surface of the hopper; and
   an electrically-operable position control system operatively coupled with the control gate and adapted for controlling the position of the control gate between a fully closed position and a fully open position, wherein the open position is defined by the aperture defined in the control gate fully aligned with the aperture defined in the bottom surface of the hopper and the closed position is defined by the aperture defined in the control gate fully out of alignment with the aperture defined in the bottom surface of the hopper, wherein the position control system is operable to position the control gate at at least one partial-alignment position between the fully open and closed positions;
   wherein the position control system includes a first limit switch and a carriage linked to the control gate, the carriage being configured to move along an actuating rod relative to the first limit switch, wherein the carriage includes a second limit switch and a linear adjustment rod extending out from the carriage, wherein the position control system includes a rotary knob configured to be turned by a user having a helix portion with an inclined surface, the linear adjustment rod having a proximal end aligned to contact the helix portion of the rotary knob and an opposite distal end positioned within the carriage, whereby turning the rotary knob causes the helix portion to rotate thereby changing the location along the inclined surface that is aligned with the proximal end of the linear adjustment rod;

wherein the carriage is configured to move along the actuating rod in a first direction until the carriage contacts the first limit switch, whereby movement of the carriage causes movement of the control gate, whereby contact between the carriage and the first limit switch causes further movement of the carriage in the first direction to be stopped corresponding to the closed position of the control gate, wherein the carriage is configured to move along the actuating rod in a second direction opposite the first direction so that the proximal end of the linear adjustment rod contacts the inclined surface, whereby contact between the linear adjustment rod and the inclined surfaces causes further movement of the linear adjustment rod to be stopped, wherein the carriage is configured to continue moving along the actuating rod in the second direction relative to the linear adjustment rod until the second limit switch within the carriage contacts the distal end of the linear adjustment rod, whereby contact between the second limit switch and the distal end of the linear adjustment rod causes further movement of the carriage in the second direction to be stopped corresponding to the open or partial-alignment position of the control gate based on the linear position of the linear adjustment rod.

10. The spreader of claim 9, wherein the carriage carries a positioning rod extending out from a first side of the carriage, with the linear actuating rod extending out from a second side of the carriage opposite the first side, wherein the positioning rod is linked via a linkage system to the control gate.

11. The spreader of claim 9, wherein the position of the first limit switch is stationary within the position control system.

12. The spreader of claim 9, wherein the second limit switch is positioned within the carriage and is configured to move with the carriage.

13. The spreader of claim 9, wherein the position control system includes a motor operatively coupled to the actuating rod and operable to actuate movement of the carriage along the actuating rod, and wherein the position control system includes a user control switch operatively coupled to the motor and being operable to control the operation of the motor.

14. The spreader of claim 9, wherein the carriage is linearly aligned with the first limit switch and the linear adjustment rod is linearly aligned with the second limit switch positioned within the carriage.

15. A method for operating a spreader, comprising:
providing a spreader having a hopper for holding a quantity of material, wherein the spreader includes a control gate to control the flow of material from the hopper, wherein the spreader includes a control system for controlling the position of the control gate between a closed position, an open position and at least one adjustably open position between the open and closed positions, wherein the control system includes a motor operatively controlled by a motor control switch, a carriage configured to move along an actuating rod operatively coupled to the motor, and a rotary knob configured to cooperate with a linear adjustment rod, the linear adjustment rod being configured to travel within a linear positional range;

placing a quantity of material in the hopper of the spreader;

turning the knob to a selected position representing one of the open or adjustably open positions, wherein the selected position of the knob corresponds to a selected position of the linear adjustment rod within the linear positional range;

activating the motor control switch to move the control gate to the open or adjustably open position represented by the selected position of the knob;

the switch sending a signal to the motor to activate movement of the carriage;

the motor causing the carriage to move along the actuating rod in a first direction until the limit switch on the carriage contacts the distal end of the linear adjustment rod;

the motor ceasing movement of the carriage at a first stopped position as a result of the contact between the limit switch on the carriage and the linear adjustment rod, wherein the first stopped position of the carriage corresponds to the open or adjustably open position represented by the selected position of the knob; and operating the spreader to spread the material out of the hopper.

16. The method of claim 15, wherein the control system includes a stationary second limit switch aligned with the carriage.

17. The method of claim 16, further comprising:
activating the motor control switch to move the control gate to the closed position;

the switch sending a signal to the motor to activate movement of the carriage;

the motor causing the carriage to move along the actuating rod in a second direction until the carriage contacts the stationary second limit switch; and the motor ceasing movement of the carriage at a second stopped position as a result of the contact between the stationary second limit switch and the carriage, wherein the second stopped position of the carriage corresponds to the closed position of the control gate.

18. The method of claim 15, wherein the rotary knob includes a helix portion having an inclined surface and wherein the linear adjustment rod is operatively coupled to the helix portion, whereby turning the knob causes the helix portion to rotate which causes linear movement of the linear adjustment rod.

19. The method of claim 15, wherein the linear adjustment rod is engaged with the carriage.

* * * * *